Oct. 7, 1930.   G. S. WILSON   1,777,343
DEVICE FOR THE HEATING OF WINDOWS
Filed Feb. 11, 1928
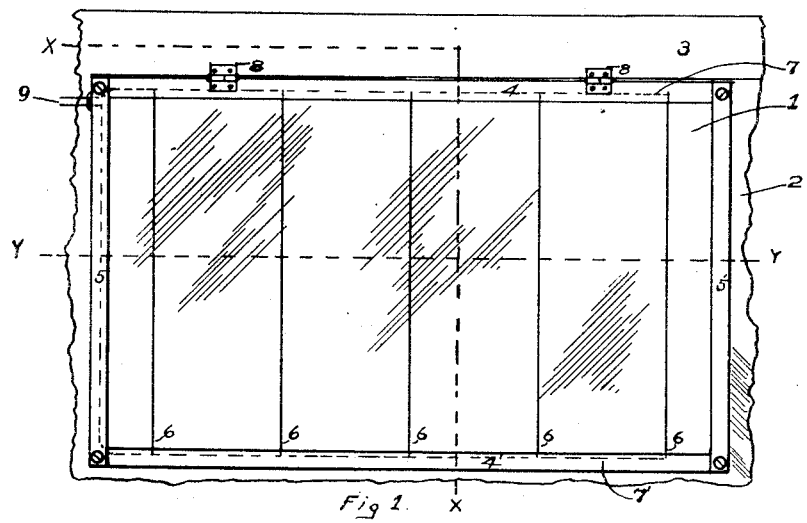
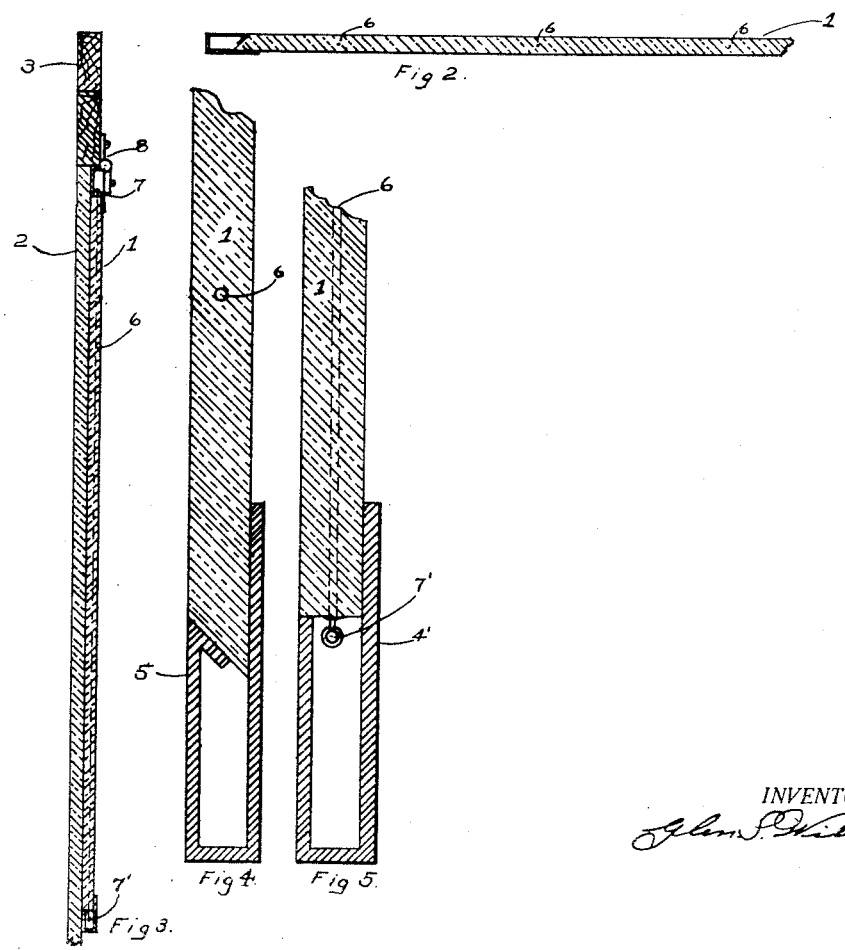
INVENTOR
Glenn S. Wilson Patented Oct. 7, 1930

1,777,343

UNITED STATES PATENT OFFICE

GLEN S. WILSON, OF LOS ANGELES, CALIFORNIA, ASSIGNOR OF TWO-THIRDS TO D. E. STEWART, OF HUNTINGTON PARK, CALIFORNIA

DEVICE FOR THE HEATING OF WINDOWS

Application filed February 11, 1928. Serial No. 253,662.

My invention relates to the device which can be used to heat the windows of street cars, motor vehicles, or windows on other moving or stationary objects upon which frost or ice collects in inclement weather and tends to destroy the transparency of the window. Particularly this invention relates to a device for heating the front windows of motor vehicles upon which frost and ice collect. The device supplies sufficient heat so that frost or ice is melted, thus enabling the ordinary windshield wiper, which would otherwise be inoperative, to function. Further objects of the invention are, first, to provide transparent heating medium which may be placed in close contact with the window or windshield to be heated. A second object is to provide a means for removing the heating element from the window or windshield into an out-of-the-way place; further to provide means for attachment to either windshield or window of a vehicle and means for heating the entire element by electricity. Further objects will appear in the following specification.

I attain these objects by the device illustrated in the accompanying drawing in which, Figure 1 represents a fractional section of an automobile windshield showing the heating device attached to the upper frame of the windshield; Figure 2 is a partial cross section of the heating element along the line Y—Y; Figure 3 is a vertical cross section of the windshield and heating element in place along the line X—X in Figure 1; Figure 4 is an enlarged partial horizontal cross section showing the details of the frame holding the heating glass; Figure 5 is an enlarged partial vertical cross section showing the details of the frame at the top and bottom. Similar numerals refer to similar parts throughout the several views.

In Figure 1 a rectangular portion of plate glass is shown in which are imbedded heating elements 6, which are lengths of resistance wire, the coefficient of expansion of which is practically the same as the glass. The tops of these resistance wires are joined together by a conductive bus bar 7, while the bottoms are similarly joined by the bus bar 7'. The bus bars run in the channels of the frames 4 and 4', respectively, as is more clearly shown in Figures 3 and 5. The lower bus bar 7' is continued up through the frame 5 and the two connections brought out at 9. This glass, containing said heating elements, is supported in the metal frame whose upper side 4 is equipped with hinges 8 to attach to the top of the frame of the vehicle 3, whose window 2, it is desired to heat. Referring to Figure 5, I prefer to have the metal frame constructed so that the side next to the window to be heated is flush with the heating glass while the other side of the frame is intended to form a channel and rest for the glass. The side members of the frames 5 and 5' are constructed as shown in Figure 4 and in such a manner as to allow the side of the frame next to the window to be flush with the heating glass which in turn is beveled as shown and is gripped between its beveled edge and the rear extension of the frame. Thus the glass is held in place by the binding of the frames 5 and 5' to fit the 45 degree bevel on each edge, which prevent it from slipping forward out of place. It is kept from falling backward out of place by all four members of the frame as shown.

I have found that sufficient heat is generated and communicated to the window or windshield if the elements are placed from two to four inches apart. The obstruction to vision by reason of the heating elements is practically negligible, and while I have described the above device as an attachment to use in back of an ordinary windshield of a motor vehicle, I do not wish to be limited to this use but intend that my claims shall extend to the use of heating elements in the windshield itself or in any window upon which frost or ice collects, obscuring vision. Therefore, having fully described my invention I make the following claims.

I claim:—

1. In a device of the kind disclosed a pane of glass having imbedded therein electric resistance heating elements, means for connecting said heating elements to a source of electric energy, a metal frame constructed so that said pane of glass may be placed in direct contact with the windshield of the motor vehicle, hinged means for support for said metal frame upon said windshield whereby said pane of glass is supported in said metal frame in such a manner that one side of the frame does not protrude beyond the plane of the glass on that side.

2. In a windshield heater for vehicles, in combination, a transparent pane of glass having the vertical edges thereof beveled; a metal supporting frame having its vertical elements beveled on the inner side whereby the beveled edge of the glass pane cooperating therewith holds said pane against forward movement, and having an inwardly extending back portion whereby the pane will be supported against backward movement; a plurality of relatively small, widely spaced vertical heating elements imbedded in said pane extending parallel to each other thru said pane, and having their ends protruding sufficiently to make electrical contact with a source of electric current; means for adjustably attaching said frame to the inner side of the windshield of a vehicle, whereby said pane of glass may be brought into close contact therewith when in use, and may be swung away from said windshield when not in use, substantially as described.

3. In a windshield heater for vehicles, in combination; a transparent pane of glass, having the vertical edges thereof beveled; a metal supporting frame having its vertical elements beveled on the inner side whereby the beveled edge of the glass pane cooperating therewith holds said pane against forward movement, and having an inwardly extending back portion whereby the pane will be supported against backward movement; a plurality of relatively small widely spaced, vertical and parallel electrical resistance heating elements imbedded in said pane of glass, having their ends protruding sufficiently for electrical connection; a pair of bus-bars extending in a hollow portion of the horizontal members of said frame making electrical contact with the upper and lower ends of said heating elements respectively; means for connecting said bus-bars to a source of electric energy; means for hingedly attaching said frame to the inner side of said windshield whereby, when in use, the pane may be brought into intimate contact with said windshield, and may be swung out of the line of vision when not in use, substantially as described.

4. In a device for heating windows and the like, in combination, a transparent glass pane having parallel relatively widely spaced vertical heating wires embedded therein, the opposite ends of which protrude whereby they may be connected to bus-bars leading to a source of electric current, a frame adapted to hold said glass pane, the forward edges of which do not protrude beyond the forward face of said pane whereby said face may be brought into intimate contact with the rear face of the window to be heated, bus-bars lying within said frame and joining the respective ends of said heating wires, means of connecting said bus-bars to a source of electric current, means of hingedly attaching said frame to the frame of the window to be heated, whereby it may be swung either flat against the window to be heated or away therefrom and out of the line of vision, substantially as described.

5. In a device of the kind disclosed, in combination, a rectangular transparent glass pane, having parallel relatively widely spaced, vertical electrical resistance heating wires embedded therein with their respective ends protruding whereby bus-bars may be connected thereto, said heating wires having substantially the same co-efficient of expansion as the glass in said pane, said pane having its forward vertical edges angularly beveled whereby means of attachment to and retention within the supporting frame is provided, a supporting frame comprising upper and lower members having channels adapted to accommodate bus-bars, and end members cooperative with the angular bevel of the edges of said pane whereby no part of said frame extends beyond the plane of the front face of said pane, bus-bars interconnecting the upper and lower ends, respectively, of said heating wires and adapted to lie within the channels in said upper and lower frame members, means of electrically connecting said bus-bars to a source of electric current, and means for hingedly attaching said supporting frame to the frame of the window to be heated whereby said pane is brought into intimate surface contact with the said window to be heated, or swung to a position out of the line of vision, substantially as described.

6. In a device of the kind disclosed, in combination, a front window pane of transparent glass supported in a frame, with a rear pane of transparent glass, having parallel relatively widely spaced, vertical electrical resistance heating wires embedded therein with their respective ends protruding whereby bus-bars may be connected thereto, said heating wires having substantially the same co-efficient of expansion as the glass in said pane, said pane having its forward vertical edges angularly beveled whereby means of attachment to and retention within the supporting frame is provided, a supporting frame for said rear pane comprising upper and lower members having channels adapted to accommodate bus-bars, and end members cooperative with the angular bevel of the edges of said pane whereby no part of said frame extends beyond the plane of the front face of said pane, bus-bars interconnecting the upper and lower ends, respectively, of said heating wires and adapted to lie within the channels in said upper and lower frame members, means of electrically connecting said bus-bars to a source of electric current and hinged means whereby said front and rear panes may be brought into surface contact or swing apart substantially as described.

GLEN S. WILSON.